(12) United States Patent
Lynch

(10) Patent No.: US 9,730,280 B2
(45) Date of Patent: Aug. 8, 2017

(54) RIPPLE REDUCTION CIRCUIT FOR SEQUENTIAL LINEAR LED DRIVERS

(71) Applicant: Microchip Technology Incorporated, Chandler, AZ (US)

(72) Inventor: Scott Lynch, Half Moon Bay, CA (US)

(73) Assignee: Microchip Technology Inc., Chandler, AZ (US)

( * ) Notice: Subject to any disclaimer, the term of this patent is extended or adjusted under 35 U.S.C. 154(b) by 0 days.

(21) Appl. No.: 15/277,566

(22) Filed: Sep. 27, 2016

(65) Prior Publication Data

US 2017/0099708 A1 Apr. 6, 2017

Related U.S. Application Data

(60) Provisional application No. 62/235,629, filed on Oct. 1, 2015.

(51) Int. Cl.
*H05B 37/00* (2006.01)
*H05B 33/08* (2006.01)
*H02M 1/14* (2006.01)

(52) U.S. Cl.
CPC .......... *H05B 33/0812* (2013.01); *H02M 1/14* (2013.01)

(58) Field of Classification Search
CPC .............. H05B 33/0812; H05B 33/083; H05B 33/0836; H05B 37/036; H02M 1/24
See application file for complete search history.

(56) References Cited

U.S. PATENT DOCUMENTS

| 2013/0026924 A1* | 1/2013 | Jong ................... H05B 33/0818 315/113 |
| 2013/0200802 A1 | 8/2013 | Sakuragi et al. |
| 2013/0264960 A1 | 10/2013 | Cho et al. |
| 2013/0313984 A1* | 11/2013 | Maiwald ............ H05B 33/0824 315/188 |

(Continued)

FOREIGN PATENT DOCUMENTS

| DE | 4129059 A1 | 3/1993 |
| DE | 102008018242 A1 | 10/2008 |

(Continued)

OTHER PUBLICATIONS

European Patent Office, International Search Report for International Application No. PCT/US2016/054061, dated Dec. 16, 2016.

*Primary Examiner* — Jason M Crawford
(74) *Attorney, Agent, or Firm* — Burr & Forman LLP; Ryan M. Corbett

(57) ABSTRACT

A ripple reduction circuit is provided. The ripple reduction circuit may include a ripple capacitor configured to drive at least a first segment of a string of light emitting diodes (LEDs), a first diode having an anode coupled to the ripple capacitor, and a cathode configured to be coupled to an input end of the first LED segment, a second diode having a cathode coupled to the ripple capacitor and the anode of the first diode, and an anode configured to be coupled between the first LED segment and a second LED segment of the string of LEDs, a third diode having an anode coupled to the ripple capacitor, and a cathode configured to be coupled to a last LED segment of the string of LEDs, and a fourth diode having a cathode coupled to the ripple capacitor and the anode of the third diode.

12 Claims, 4 Drawing Sheets

(56) References Cited

U.S. PATENT DOCUMENTS

| | | | | |
|---|---|---|---|---|
| 2014/0125238 A1* | 5/2014 | Kwon | ................ | H05B 33/0809 |
| | | | | 315/193 |
| 2014/0145628 A1 | 5/2014 | Wang et al. | | |
| 2015/0382414 A1* | 12/2015 | Lynch | ................ | H05B 33/0812 |
| | | | | 315/187 |
| 2016/0007420 A1* | 1/2016 | Gong | ................ | H05B 33/0815 |
| | | | | 315/187 |

FOREIGN PATENT DOCUMENTS

| | | | |
|---|---|---|---|
| EP | 2670219 | A2 | 4/2013 |
| WO | 20120107293 | A2 | 8/2012 |
| WO | 2012131530 | A1 | 10/2012 |
| WO | 2012139576 | A2 | 10/2012 |

\* cited by examiner

RELATED ART

RIPPLE REDUCTION CIRCUIT FOR SEQUENTIAL LINEAR LED DRIVERS

CROSS-REFERENCE TO RELATED APPLICATION

This application claims the benefit of U.S. Provisional Patent Application No. 62/235,629, filed on Oct. 1, 2015, which is incorporated herein by reference in its entirety.

TECHNICAL FIELD

The present disclosure relates generally to a sequential linear LED driver circuit that reduces the amount of ripple in light output from the LEDs.

SUMMARY

A sequential linear LED driver consists of a long string of LEDs that are tapped at multiple locations along the string, with a current regulator connected at each tap point. As the rectified AC voltage rises, downstream LED string segments become forward biased and all upstream regulators are turned off once a downstream regulator achieves regulation. This limits the voltage across a current regulator when the current regulator is conducting, thereby minimizing power loss and maximizing efficiency.

However, when the rectified AC voltage is less than the voltage drop of the first LED segment, the amount of light output goes to zero. As shown in FIG. 1, the light output is intermittent, with a period of no light output when the rectified voltage drops below the first LED segment voltage drop. This intermittent light can be visually distracting and substantially limits the use of sequential linear LED drivers, especially for indoor applications.

FIG. 2 depicts a circuit from the related art, in which a capacitor is used to store energy, but the capacitor charging current is uncontrolled and results in a large current spike drawn from the AC line (peak charging). This results in a heavily distorted AC line current waveform and renders the driver incompatible with dimmers. Accordingly, an LED driver circuit is needed that reduces the light output ripple to make the sequential linear LED driver suitable for a wider range of applications, such as indoor applications, while at the same time providing a relatively smooth line current waveform and dimmer compatibility.

According to an aspect of one or more exemplary embodiments of the present disclosure, there is provided a circuit that generates low light output ripple, and forces all active current paths to go through at least one segment of the LED string, ensuring that light output is uninterrupted during all phases of operation (except the idle phase, as discussed below). In addition, according to one or more exemplary embodiments, currents are forced to pass through a single control point. The single control point facilitates input current waveform control and avoids peak-charging of the ripple reduction capacitor.

According to one or more exemplary embodiments, there is provided a ripple reduction circuit. The ripple reduction circuit according to one or more exemplary embodiments may include a ripple capacitor configured to drive at least a first segment of a string of light emitting diodes (LEDs), a first diode having an anode coupled to the ripple capacitor, and a cathode configured to be coupled to an input end of the first segment of the LED string, a second diode having a cathode coupled to the ripple capacitor and the anode of the first diode, and an anode configured to be coupled between the first segment of LEDs and a second segment of the string of LEDs, a third diode having an anode coupled to the ripple capacitor, and a cathode configured to be coupled to a last segment of the string of LEDs, and a fourth diode having a cathode coupled to the ripple capacitor and the anode of the third diode.

The fourth diode may include an anode coupled to ground.

The fourth diode may include an anode configured to be coupled to a voltage divider circuit that is coupled to a single control point of an LED driver circuit.

The LED driver circuit may include a first current regulator coupled to the string of LEDs between the first segment and second segment thereof, and coupled to the anode of the second diode, and a fourth current regulator coupled to the last LED segment, and coupled to the cathode of the third diode. The LED driver circuit may also include a second current regulator coupled to the string of LEDs between a second LED segment of the string of LEDs and a third LED segment of the string of LEDs, and a third current regulator coupled to the string of LEDs between the third LED segment and the last LED segment thereof.

According to another aspect of one or more exemplary embodiments, there may be provided a ripple reduction circuit including a ripple capacitor configured to drive at least a first segment of a string of light emitting diodes (LEDs), a first diode having an anode coupled to the ripple capacitor, and a cathode configured to be coupled to an input end of the first LED segment, a second diode having a cathode coupled to the ripple capacitor and the anode of the first diode, and an anode configured to be coupled between two LEDs of the first LED segment, a third diode having a cathode coupled to the ripple capacitor, and an anode coupled to ground, and a fourth diode having an anode coupled to the ripple capacitor and a cathode coupled to two LEDs of a fourth segment of the string of LEDs.

The ripple reduction circuit according to an exemplary embodiment may include a first current regulator coupled to the LED string between a first LED segment and a second LED segment, a second current regulator coupled to the LED string between the second LED segment and a third LED segment, a third current regulator coupled to the LED string between the third LED segment and a fourth LED segment, and/or a fourth current regulator coupled to the LED string at the fourth LED segment.

DETAILED DESCRIPTION OF EXEMPLARY EMBODIMENTS

Figure 1:
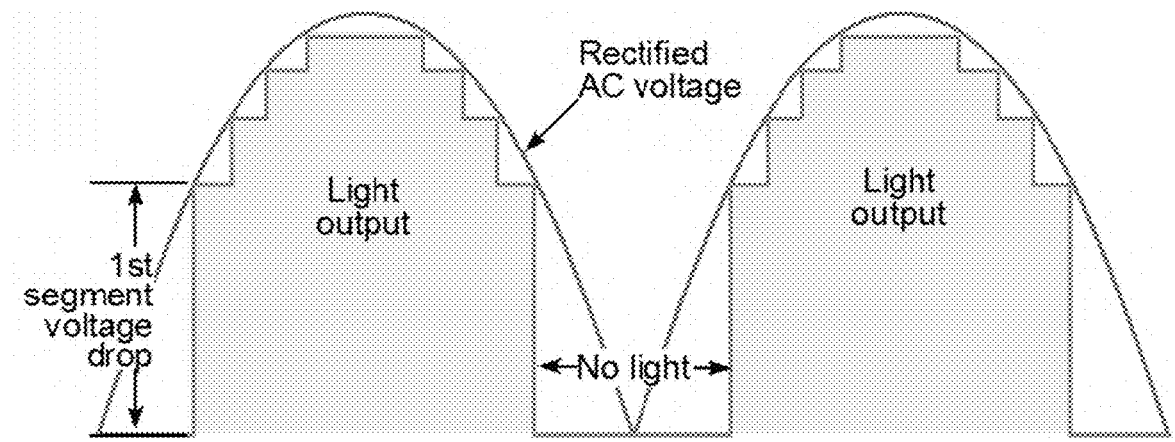
FIG. 1 illustrates a light output waveform showing light output by an LED driver of the related art in relation to rectified AC voltage.
Figure 2:
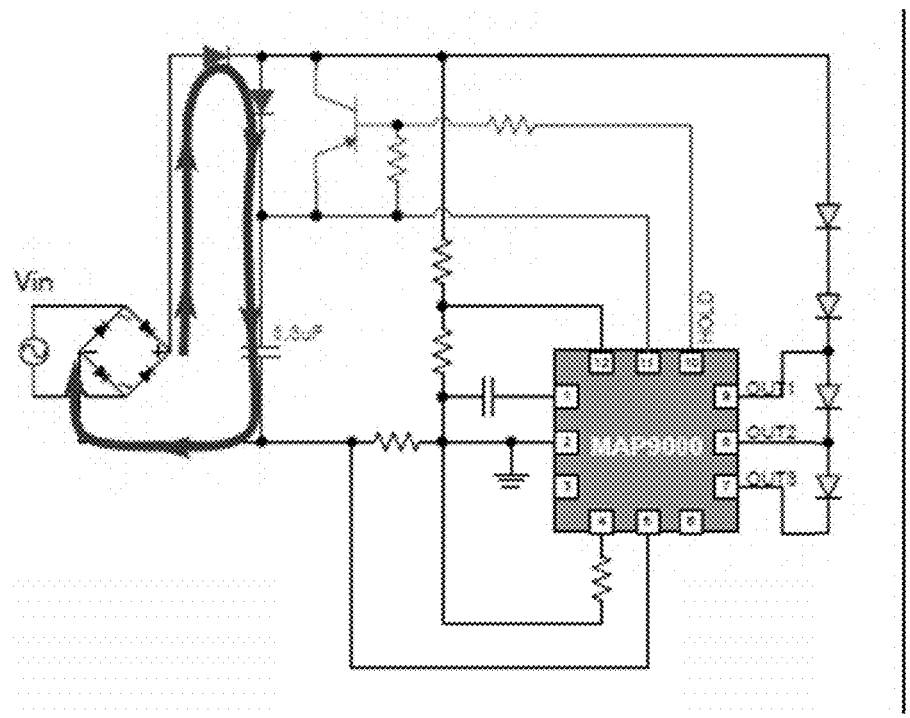
FIG. 2 illustrates an LED driver circuit of the related art.

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

Figure 3:
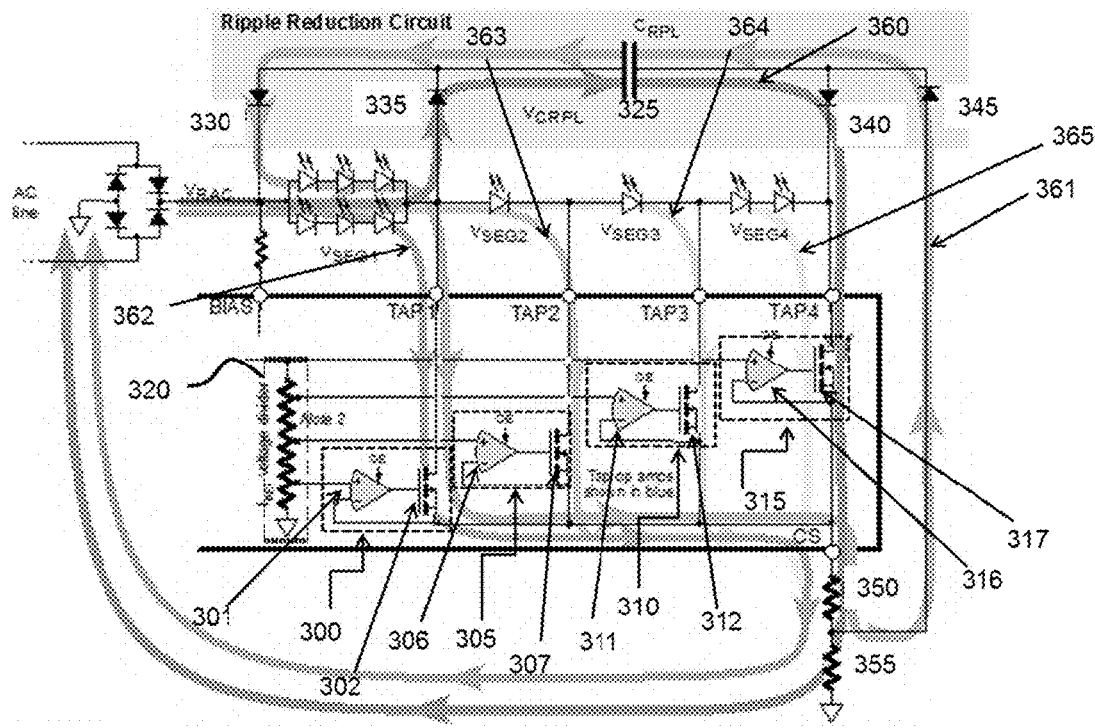
FIG. 3 illustrates a ripple reduction circuit for a sequential linear LED driver circuit according to an exemplary embodiment.

FIG. 3 depicts a ripple reduction circuit for a sequential linear LED driver circuit according to an exemplary embodiment. Although 4 stages are shown, the ripple reduction circuit may be applied to any number of stages. The circuit according to the exemplary embodiment may include a first current regulator 300, a second current regulator 305, a third current regulator 310, and a fourth current regulator 315. Each of the regulators may include an error amplifier and field effect transistor (FET). The positive input of each error amplifier may be connected to a resistive voltage divider 320. The error amplifiers may be connected to the resistive voltage divider 320 at various points, such that $V_{REF4}>V_{REF3}>V_{REF2}>V_{REF1}$, where $V_{REF4}$ is connected to the positive input of error amplifier 316 of fourth current regulator 315, $V_{REF3}$ is connected to the positive input of error amplifier 311 of third current regulator 310, $V_{REF2}$ is connected to the positive input of error amplifier 306 of second current regulator 305, and $V_{REF1}$ is connected to the positive input of error amplifier 301 of first current regulator 300. The output of each error amplifier 301, 306, 311, and 316 may be respectively connected to the gate of FETs 302, 307, 312, and 317 of first current regulator 300, second current regulator 305, third current regulator 310, and fourth current regulator 315, respectively. The source of each FET 302, 307, 312, and 317 may be connected to the negative input of error amplifiers 301, 306, 311, and 315, respectively. The drain of each FET may be connected between two segments of an LED string. For example, the drain of FET 302 may be connected between a first LED segment $SEG_1$ and a second LED segment $SEG_2$. The drain of FET 307 may be connected between second LED segment $SEG_2$ and a third LED segment $SEG_3$. The drain of FET 312 may be connected between third LED segment $SEG_3$ and a fourth LED segment $SEG_4$. The drain of FET 317 may be connected to an output of the fourth LED segment $SEG_4$. The first LED segment $SEG_1$ may include one or more LEDs connected in parallel to one or more other LEDs. The sources of FETs 302, 307, 312, and 317 may be connected to each other at a single shared control point CS. Although FETs are depicted, other current-control devices may be used such as bipolar transistors or IGBTs.

The ripple reduction circuit of the exemplary embodiment may include a ripple capacitor 325, a first diode 330, a second diode 335, a third diode 340, and a fourth diode 345. The anode of the first diode 330 may be connected to the ripple capacitor 325, and its cathode may be connected to the input of the first LED segment $SEG_1$. The anode of the second diode 335 may be connected to the output of the first LED segment $SEG_1$. The cathode of the second diode 335 may be connected to the ripple capacitor 325. The anode of the third diode 340 may be connected to the ripple capacitor 325, and the cathode of the third diode 340 may be connected to the output of the fourth LED segment $SEG_4$. The cathode of the fourth diode 345 may be connected to the ripple capacitor 325, and the anode of the fourth diode 345 may be connected to the voltage divider consisting of resistors 350 and 355.

In operation, the circuit shown in the exemplary embodiment of FIG. 3 operates in four phases: a recharge phase, a hold-up phase, a direct phase, and under certain conditions, an idle phase. In the recharge phase, the ripple capacitor 325 is recharged when $(V_{RAC}-V_{SEG1})>V_{CRPL}$. The maximum voltage that the ripple capacitor 325 can be charged to is the sum of the voltage drops across the second, third, and fourth segments of LEDs, $SEG_2$, $SEG_3$, and $SEG_4$. The number of LEDs included in each segment of LEDs may be chosen so that the cumulative voltage drop does not exceed the voltage rating of the ripple capacitor 325. In the recharge phase, current follows path 360 through the first LED segment $SEG_1$, charges the ripple capacitor 325, and then discharges through the third diode 340, the single control point CS, and resistors 350 and 355. By passing through the first LED segment $SEG_1$, the circuit provides continuous light while recharging the ripple capacitor 325.

In the hold-up phase, the rectified AC voltage, $V_{RAC}$, falls below the ripple capacitor voltage $V_{CRPL}$, such that the ripple capacitor 325 supplies power to the first LED segment $SEG_1$. In the hold-up phase, the current follows path 361 from the ripple capacitor 325, through the first LED segment $SEG_1$, FET 302, and single control point CS, and discharges through resistor 350, but not resistor 355. Unlike the recharge phase path 360, the hold-up phase path 361 does not include resistor 355, which reduces the sense resistance and increases the current in the hold-up phase. This allows for higher currents to be drawn from the AC line to improve tracking between the line voltage waveform and the line current waveform by raising the current amplitude during the hold-up phase.

In the direct phase, the current follows paths 362, 363, 364 and 365. The circuit is in the direct phase when $V_{CRPL}<V_{RAC}<(V_{CRPL}+V_{SEG1})$, in which case the LED segments are supplied directly from the AC line. The window when the direct phase is active is determined by $V_{SEG1}$. In the direct phase, the current flows through current regulators 300, 305, 310, and 315, through single control point CS, and discharges through resistors 350 and 355.

In the idle phase, the AC line voltage is so low that there is not enough voltage to charge the ripple capacitor 325 sufficiently to power the first segment of LEDs $SEG_1$ and strobing will occur. The idle phase is preferably avoided so as to avoid strobing.

Figure 4:
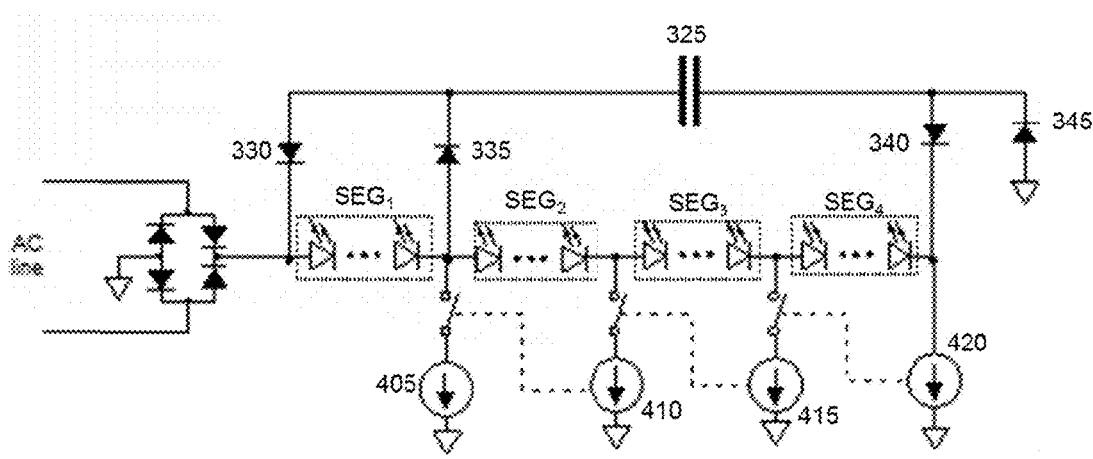
FIG. 4 illustrates a ripple reduction circuit according to another exemplary embodiment.

In addition, the ripple reduction circuit of the exemplary embodiments may be used with other regulator circuits. For example, FIG. 4 depicts a ripple reduction circuit according to another exemplary embodiment. Referring to FIG. 4, the circuit of the exemplary embodiment may include ripple capacitor 325, first diode 330, second diode 335, third diode 340, and fourth diode 345. The circuit also may include four LED segments, $SEG_1$, $SEG_2$, $SEG_3$, and $SEG_4$. The cathode of the first diode 330 may be connected to the input of the first segment of LEDs $SEG_1$, and the anode of the first diode 330 may be connected to the ripple capacitor 325. The anode of the second diode 335 may be coupled between the first segment of LEDs $SEG_1$ and the second segment of LEDs $SEG_2$, and the cathode of the second diode 335 may be connected to the ripple capacitor 325. A first current regulator 405 may be connected to the anode of the second diode 335, and between the first segment of LEDs $SEG_1$ and the second segment of LEDs $SEG_2$.

A second current regulator 410 may be connected between the second segment of LEDs $SEG_2$ and the third segment of LEDs SEG$_3$. A third current regulator 415 may be connected between the third segment of LEDs SEG$_3$ and the fourth segment of LEDs SEG$_4$. The anode of third diode 340 may be connected to the ripple capacitor 325, and the cathode of third diode 340 may be connected to the output of the fourth segment of LEDs SEG$_4$. A fourth current regulator 420 may also be connected to the output of the fourth segment of LEDs SEG$_4$. The cathode of fourth diode 345 may be connected to the ripple capacitor 325, and the anode of the fourth diode 345 may be connected to ground.

Figure 5:
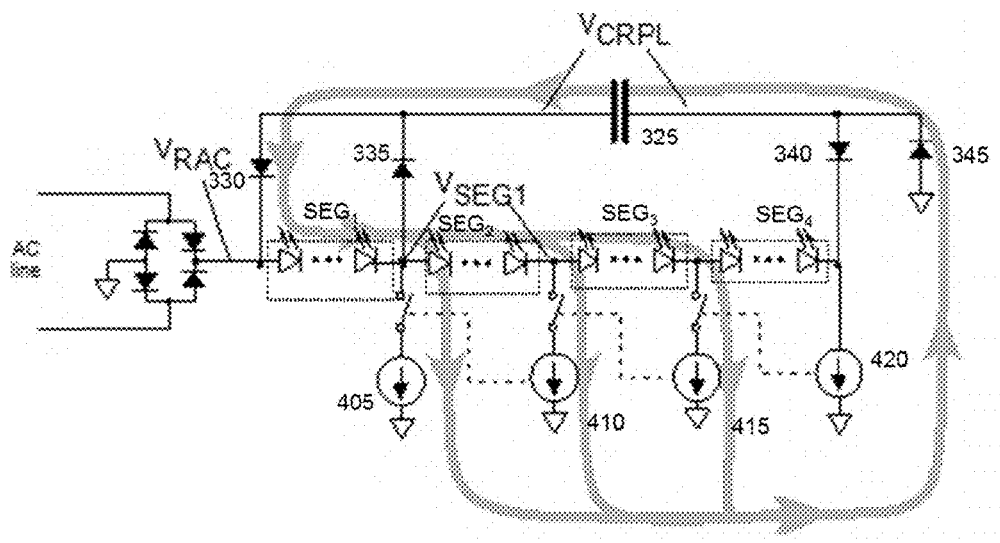
FIG. 5 illustrates a hold-up phase of operation of the ripple reduction circuit according to the exemplary embodiment of FIG. 4.
Figure 6:
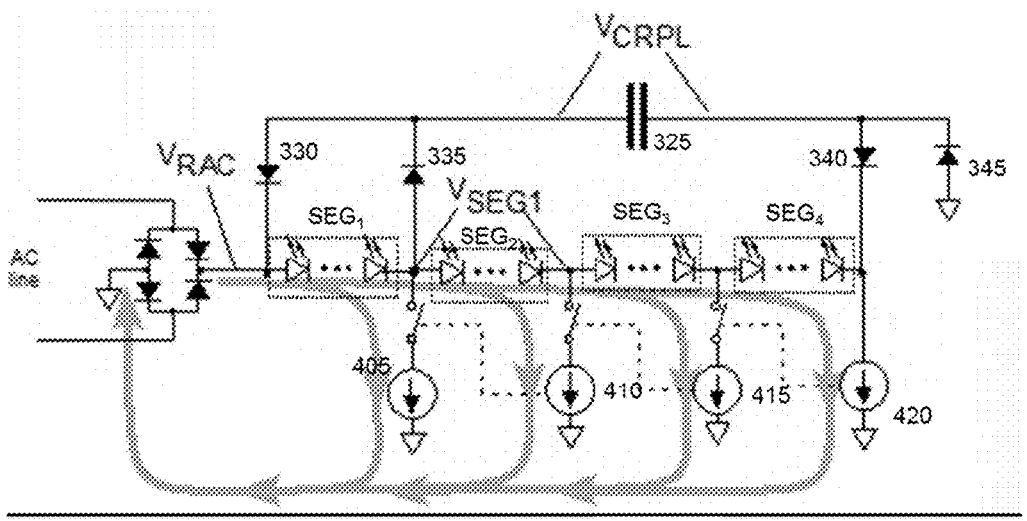
FIG. 6 illustrates a direct phase of operation of the ripple reduction circuit according to the exemplary embodiment of FIG. 4.
Figure 7:
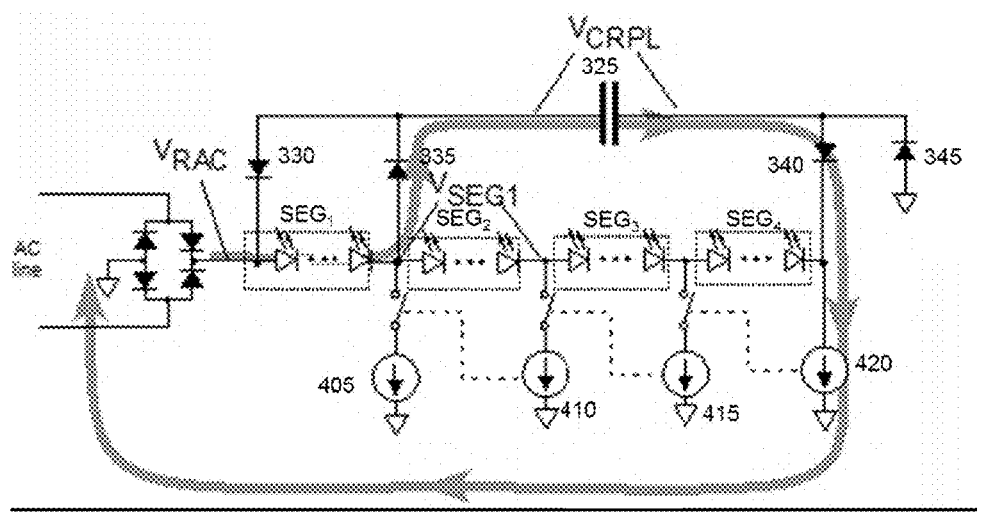
FIG. 7 illustrates a recharge phase of operation of the ripple reduction circuit according to the exemplary embodiment of FIG. 4.

FIGS. 5, 6, and 7 describe three different phases in which the circuit of FIG. 4 can operate. FIG. 5 depicts the hold-up phase, in which the voltage of the ripple capacitor 325 is used to supply the LEDs. The circuit of FIG. 4 enters the hold-up phase when the rectified AC voltage V$_{RAC}$ falls below the voltage V$_{CRPL}$ of the ripple capacitor 325. The current may flow through one or more segments of the LEDs while in the hold-up phase.

FIG. 6 depicts the direct phase, in which the LEDs are supplied directly from the AC line. The circuit of FIG. 4 is in the direct phase when the V$_{CRPL}$<V$_{RAC}$<(V$_{CRPL}$+V$_{SEG1}$). FIG. 7 depicts the recharge phase, in which the ripple capacitor 325 is re-charged. In the circuit of FIG. 4, the current flows through the first segment of LEDs SEG$_1$, which provides continuous light output while the ripple capacitor is re-charged. The circuit enters the re-charge phase when the difference between the rectified voltage V$_{RAC}$ and the voltage at the first segment of LEDs V$_{SEG1}$ is greater than the voltage V$_{CRPL}$ at the ripple capacitor 325.

Figure 8:
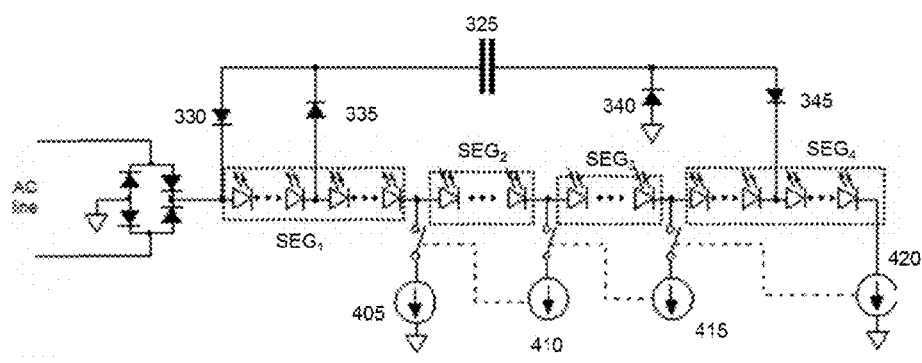
FIG. 8 illustrates a ripple reduction circuit according to yet another exemplary embodiment.

FIG. 8 depicts a ripple circuit according to yet another exemplary embodiment. The exemplary circuit of FIG. 8 is similar to the exemplary circuit of FIG. 4, except that the anode of the second diode 335 may be connected to two LEDs of the first LED segment SEG$_1$, while the cathode of the second diode 335 may be connected to the ripple capacitor 325. The first current regulator 405 may be connected between the first LED segment SEG$_1$ and the second LED segment SEG$_2$. Unlike the exemplary embodiment of FIG. 4, the first tap point (i.e., where the first current regulator connects to the LED string) is at a different location along the LED string than where the second diode 335 connects to the LED string.

In the exemplary embodiment of FIG. 8, the second current regulator 410 may be connected between the second LED segment SEG$_2$ and the third LED segment SEG$_3$. The third current regulator 415 may be connected between the third LED segment SEG$_3$ and the fourth LED segment SEG$_4$. The cathode of third diode 340 may be connected to the ripple capacitor 325, while the anode of the third diode 340 may be connected to ground. The anode of the fourth diode 345 may be connected to the ripple capacitor, and the cathode of the fourth diode 345 may be connected between two LEDs of the fourth LED segment SEG$_4$. The fourth current regulator may be connected to the output of the fourth LED segment SEG$_4$. Although the circuit of FIG. 8 shows four LED segments, the circuit may contain greater or fewer LED segments. In addition, as shown in FIG. 8, the current regulators are not required to be connected to the LED string at the same location on the LED string as the diodes of the ripple reduction circuit are connected.

The general principle of the ripple reduction circuit may be applied to many different configurations of LEDs, diodes, current regulators, and ripple capacitor, and is not limited to the exemplary configurations shown here.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:

1. A ripple reduction circuit comprising:
a ripple capacitor configured to drive at least a first segment of a string of light emitting diodes (LEDs);
a first diode having an anode coupled to the ripple capacitor, and a cathode configured to be coupled to an input end of the first LED segment;
a second diode having a cathode coupled to the ripple capacitor and the anode of the first diode, and an anode configured to be coupled between the first LED segment and a second LED segment of the string of LEDs;
a third diode having an anode coupled to the ripple capacitor, and a cathode configured to be coupled to a last LED segment of the string of LEDs; and
a fourth diode having a cathode coupled to the ripple capacitor and the anode of the third diode.

2. The ripple reduction circuit of claim 1, wherein the fourth diode comprises an anode coupled to ground.

3. The ripple reduction circuit of claim 1, wherein the fourth diode comprises an anode configured to be coupled to a voltage divider circuit that is coupled to a single control point of an LED driver circuit.

4. The ripple reduction circuit of claim 3, wherein the LED driver circuit comprises:
a first current regulator coupled to the string of LEDs between the first segment and second segment thereof, and coupled to the anode of the second diode; and
a fourth current regulator coupled to the last segment of the string of LEDs, and coupled to the cathode of the third diode.

5. The ripple reduction circuit of claim 4, wherein the LED driver circuit further comprises:
a second current regulator coupled to the string of LEDs between a second segment of the string of LEDs and a third segment of the string of LEDs; and
a third current regulator coupled to the string of LEDs between the third segment and the last segment thereof.

6. The ripple reduction circuit of claim 3, wherein the LED driver circuit comprises:
a first current regulator coupled to the string of LEDs between the first LED segment and the second LED segment, and coupled to the anode of the second diode; and
a fourth current regulator coupled to the last LED segment, and coupled to the cathode of the third diode.

7. The ripple reduction circuit of claim 6, wherein the LED driver circuit further comprises:
a second current regulator coupled to the string of LEDs between the second LED segment and a third LED segment of the string of LEDs; and
a third current regulator coupled to the string of LEDs between the third LED segment and the last LED segment.

8. A ripple reduction circuit comprising:
a ripple capacitor configured to drive at least a first segment of a string of light emitting diodes (LEDs);
a first diode having an anode coupled to the ripple capacitor, and a cathode configured to be coupled to an input end of the first LED segment;
a second diode having a cathode coupled to the ripple capacitor and the anode of the first diode, and an anode configured to be coupled between two LEDs of the first LED segment;

a third diode having a cathode coupled to the ripple capacitor, and an anode coupled to ground; and a fourth diode having an anode coupled to the ripple capacitor and a cathode coupled to two LEDs of a fourth LED segment of the string of LEDs.

9. The ripple reduction circuit of claim 8, further comprising a first current regulator coupled to the string of LEDs between the first LED segment and a second LED segment of the string of LEDs.

10. The ripple reduction circuit of claim 9, further comprising a second current regulator coupled to the string of LEDs between the second LED segment and a third LED segment of the LED string.

11. The ripple reduction circuit of claim 10, further comprising a third current regulator coupled to the string of LEDs between the third LED segment and the fourth LED segment.

12. The ripple reduction circuit of claim 11, further comprising a fourth current regulator coupled to the fourth LED segment.

* * * * *